United States Patent [19]

Hassel

[11] Patent Number: 5,013,574

[45] Date of Patent: May 7, 1991

[54] EDIBLE DISPERSION CONTAINING A TARTARIC ACID ESTER OF MONO- AND DIGLYCERIDES AND AN EDIBLE FAT

[75] Inventor: James E. Hassel, Harrison, N.Y.

[73] Assignee: Fritzsche Dodge & Olcott Inc., New York, N.Y.

[21] Appl. No.: 333,839

[22] Filed: Apr. 3, 1989

Related U.S. Application Data

[63] Continuation of Ser. No. 54,092, May 18, 1987, abandoned, which is a continuation of Ser. No. 730,679, May 3, 1985, abandoned.

[51] Int. Cl.$^5$ .................. A23D 7/00; A23D 9/00; A23L 1/22
[52] U.S. Cl. .................. 426/612; 426/534; 426/611; 426/638; 426/651
[58] Field of Search .............. 426/534, 612, 601, 650, 426/602, 651, 611, 590, 638, 604

[56] References Cited

U.S. PATENT DOCUMENTS

| | | | |
|---|---|---|---|
| T100,503 | 4/1981 | Taylor | 426/654 |
| 2,626,218 | 1/1953 | Johnston | 426/651 |
| 2,680,690 | 6/1954 | Schumm | 426/651 |
| 2,860,054 | 11/1958 | Yanick | 426/651 |
| 3,464,831 | 9/1969 | Ziegler | 426/651 |
| 3,906,116 | 9/1975 | Quesnel | 426/651 |
| 3,958,033 | 5/1976 | Sims | 426/654 |
| 3,993,580 | 11/1976 | Galusky | 426/604 |
| 4,229,480 | 10/1980 | Suggs | 426/654 |
| 4,283,429 | 8/1981 | Todd | 426/651 |
| 4,284,657 | 8/1981 | Stanton | 426/651 |
| 4,285,981 | 8/1981 | Todd | 426/651 |
| 4,315,947 | 2/1982 | Todd | 426/650 |
| 4,343,823 | 8/1982 | Todd | 426/650 |
| 4,409,257 | 10/1983 | Deline | 426/651 |
| 4,483,880 | 11/1984 | Koizumi | 426/654 |
| 4,492,714 | 1/1985 | Cooper | 426/613 |
| 4,609,560 | 9/1986 | Yuda | 426/549 |

OTHER PUBLICATIONS

Kirk-Othmer Encyclopedia of Chemical Technology, 1979, Third Edition, vol. 7, John Wiley and Sons, New York, pp. 833-834.
Natl. Acad. of Science, 1965, Chemicals Used on Food Processing, Publication 1274 MAS/NRC, Washington, DC, pp. 81 and 246.

*Primary Examiner*—Carolyn Paden
*Attorney, Agent, or Firm*—Cooper & Dunham

[57] ABSTRACT

An edible dispersion which is prepared from (1) tartaric acid esters of mono and diglycerides and (2) an edible fat or oil or mixture thereof, wherein such fat or oil is miscible in (1). The composition is useful in flavoring or coloring foods and beverages and is dispersible in both oil and water.

6 Claims, No Drawings

EDIBLE DISPERSION CONTAINING A TARTARIC ACID ESTER OF MONO- AND DIGLYCERIDES AND AN EDIBLE FAT

This is a continuation of application Ser. No. 054,092, filed May 18, 1987 now abandoned which, in turn, is a continuation of application Ser. No. 730,679 filed May 3, 1985 which is now abandoned.

FIELD OF THE INVENTION

Liquid condimental compositions comprising edible flavorings and/or edible colorings; seasoning, flavoring, or coloring of foods and beverages using liquid spice flavorings and colorings; foods and beverages so flavored, seasoned, or colored.

PRIOR ART

The seasoning or flavoring, e.g., spicing, of foods has been accomplished in the following manner:

a. Ground Spices. This has been the traditional approach, and is still used as the primary method in the home kitchen. In more advanced technological applications, such as commercial food processing, it has been replaced by employment of spice oleoresins, which offer cleanliness and uniformity.

b. Oleoresins have traditionally been used in the following forms:

1. Directly. Oleoresin paprika, for example, is mixed with salad oil, and added to vinegar to make a separating salad dressing.

2. As dispersions on salt or dextrose. In the case of a French dressing, black pepper oleoresin may be dispersed on salt and added to the vinegar with agitation in the presence of the oil and paprika oleoresin mixture. The black pepper oleoresin will, for the most part, be dissolved into the oil phase if agitation is sufficient.

3. Black pepper oleoresin may alternatively be added to the food in a liquid form, according to:

i. U.S. Pat. Nos. 2,680,690 and 2,626,218 (Johnson and Schumm), wherein the oleoresin black pepper is claimed to be dissolved in anhydrous organic acids, such as lactic. This approach suffers from three disadvantages in practice: (1) Not all of the pepper essential oil is soluble, and two-phase systems result which cannot be evenly incorporated into the food. Flavor variation results. (2) The liquid pepper is not readily dispersible in oil phase systems.

ii. U.S. Pat. No. 2,860,054 (Yanick) utilizes less organic acid than the above, and substitutes therefor ethyl alcohol and an acetate moiety. This invention has the advantage over the Johnson Schumm developments in contributing less acidity to the food, but shares their other disadvantages, and in addition may change in composition due to evaporation of alcohol.

iii. U.S. Pat. No. 3,464,831 (Ziegler) discloses a method of making a liquid black pepper extract from a liquid black pepper oleoresin by separating the oleoresin into a liquid oil fraction and a solid fraction by applying a physical force to the oleoresin, such that the said liquid oil fraction contains liquid volatile oil, liquid non-volatile oil and dissolved piperine, and the solid fraction consists essentially of at least 60% by weight piperine. The liquid oil fraction constitutes the liquid pepper extract of the invention.

iv. U.S. Pat. No. 3,906,116 (Quesnel et al), discloses a method for preparing an aqueous emulsion of pepper oleoresin by forming an oleoresin solution or colloidal solution of the pepper oleoresin in a diluent. There is then admixed with the solution under agitation conditions a preformed mixture of an emulsion stabilizer, at least one of an edible or essential oil and then adding thereto an aqueous solution or dispersion of an emulsion stabilizer to form a final mixture. Thereafter the final mixture is emulsified.

v. U.S. Pat. No. 4,284,657 (Stanton) describes an aqueous based fluidized oleoresin composition which contains 10 to 20 percent by weight of a natural oleoresin from about 10 to 20 percent by weight of a surfactant, from about 0.25 to 2 percent by weight of an edible hydrophilic gum, from about 0.025 to 1 percent by weight of phosphoric acid and at least about 60% by weight of water. The disadvantages of this composition include at least the following: (1) the high water content limits its oil dispersibility; (2) The composition has to be preserved against microbial growth; (3) the piperine content crystallizes on storage and requires dissolution, with heat and/or agitation, in the finished food product. To be completely utilized by human taste buds, the piperine must be completely dissolved in the ultimate food to which it has been added.

vi. U.S. Pat. No. 4,285,981 to Todd et al discloses a homogeneous liquid condimental composition which is dispersible in both oil and water, and consists essentially of lecithin. tartaric esters of mono- and diglycerides and, in one embodiment oleoresin black pepper. Disadvantages of this composition include: (1) limited dispersibility in water; and (2) lack of heat stability upon dispersion in an aqueous system.

4. Oleoresins may be mixed with Polysorbate 80 USP in an amount sufficient to dissolve them and to emulsify them in aqueous systems (generally the amount is more than 200% by weight of the oleoresin), and added to the aqueous phase of the system. These mixtures cannot be added to the oil phase. In addition, Polysorbate 80, even in trace amounts, will break the emulsions present in naturally-emulsified systems such as mayonnaise. The Polysorbate itself has objectionable flavors, may contain a toxic substance known as 1,4-dioxane, and often it accelerates the development of rancid and other off-flavors.

5. The oleoresins may be spray-dried, using gums, and added to the food after mixing with sugar, starch, or water. Spray-dried products have great stability, but are expensive to produce, cannot be made from some oleoresins, and a significant portion of the volatile flavor is lost in the spray-drying process.

It is apparent from the foregoing that improved, economic, efficient, and more universally utilizable food and beverage flavoring, seasoning, and/or coloring systems, which are not characterized by inherent shortcomings and deficiencies of available prior art systems, would be highly desirable and would fulfill a long-felt need in the art. Such systems are provided by the present invention.

OBJECTS OF THIS INVENTION

The primary object of this invention is to provide a condimental system which is dispersible in both oil and water phases of a food or beverage. A second objective of this invention is to provide a single formulation which is compatible with spice oleoresins, essential oils, and natural and synthetic flavorings and colorings used in foods, beverages, or in other applications where humans or animals require non-toxic dispersing agents in the substances ingested or exposed to the oral cavity. A third objective of this invention is to overcome the deficiencies in the prior art related to the use of oleoresin black pepper, and at the same time make the water and oil dispersible black pepper flavoring composition compatible with other water and oil dispersible spice flavoring compositions, essential oils, and food colorings. A fourth objective is to provide a condimental system which has no functional effect in the food other than the dispersion of the condiment at the time of incorporation and which, for example, does not affect the usual or natural emulsions or particle aggregation in the food. A fifth objective is to provide a condimental system which is compatible with the various additives found in commercial oleoresins, such as lactic acid, mono and di-glycerides, and vegetable oils. A sixth objective is to provide a single system which will distribute flavorings or coloring between the water and oil phases of a food, depending upon the affinity of the flavor or coloring for the oil or water phase. A seventh objective is to provide a single system which will serve to flavor and color juices and beverages, especially those in which pulp or a cloud is present. An eighth objective is to provide a condimental system which has improved heat stability after dispersion in an aqueous system.

Additional objectives are:

To provide a liquid flavoring system which is compatible with all spice and herb oleoresins and essential oils. To provide a spice flavoring system in which any desirable mixture of flavors can be added to the food or beverage as a single liquid. To provide a liquid flavor which will not precipitate, separate, or stratify on standing and shipping. To provide a flavoring system which will not contribute off-flavors to the food because of its ingredients, or because its ingredients are pro-oxidants. To provide a flavoring system which can be added to the oil phase, the water phase, or both phases simultaneously in the preparation of the food or beverage. To provide a flavoring system which can be used in conjunction with special applications, such as in conjunction with the coloring of pickles covered with a flavored salt brine or sugar syrup. To provide a flavoring and coloring system which is not dependent upon the pH of the food or beverage. To provide a liquid flavoring system which is more economical than those presently in use. Still other objects will be apparent to one skilled in the art and additional objects will become apparent hereinafter.

All of the foregoing and additional objects are achieved by the provision of the flavoring, seasoning, or coloring compositions of the present invention and the foods and beverages flavored, seasoned, or colored therewith.

GLOSSARY OF TERMS

The following identification of terms will allow the reader to better understand the specific technical aspects of this invention:

Spices and Herbs

Aromatic and/or colored edible vegetable substances, the significant function of which is seasoning food. These are edible flavors or seasonings.

Oleoresin

Spice oleoresins are derived from spices and contain the sapid, odorous, and related characterizing principles of the spice. They are produced by the solvent extraction of a ground spice, with subsequent solvent removal and occasionally purifying steps to remove unwanted components, such as waxes and chlorophyll. Also an edible flavor or seasoning.

Essential Oil

The volatile oil obtained from the plants (spices and herbs). This oil usually has the characteristic (essential) odor and flavor of the spice. It is most commonly steam distilled from the spice. Another edible flavor or seasoning.

Condiment

A substance, or mixture of substances, the effect of which in a food or beverage is seasoning, flavoring and/or coloring, and which is soluble in a solvent or volatile with steam. Encompasses edible flavors or seasonings and edible colorings.

Brine and Syrup

Water or vinegar containing one percent or more salt and/or sugar (weight per volume) as commonly used in pickles and beverages and less frequently in other food applications.

Tartaric Acid Esters of Mono- and diglycerides

Obtained by esterification reaction of tartaric acid, acetic acid and citric acid, with a distilled monoglyceride, commonly referred to as diacetyl esters and widely used as a dough conditioner. Usually contains one or more acetate moieties in addition to the tartarate moiety, although this is not essential. Usually some very small percentage of triglyceride is also present. Hereinafter sometimes abbreviated "tartaric acid esters".

"w/o Flavor"

An abbreviation for "water and oil dispersible flavor" used herein to designate a water and oil dispersible condimental liquid system which is an object of our invention, described in the specification and examples, and claimed in the claims hereof.

"Consisting Essentially of"

According to established practice, this phrase means that the necessary stated ingredients are present in the necessary stated amounts, but that the presence of other ingredients or additaments which do not interfere with attainment of the objectives of the invention is not precluded. In this sense, it is to be noted that diluting and/or standardizing agents, such as propylene glycol, lactic acid, ethanol, mono- and diglycerides and esters thereof, lecithin, sorbitan fatty acid esters, etc., are not excluded to the extent that they do not interfere with attainment of the objectives of the invention.

Foods and beverages

The usual solid or liquid foods and the usual beverages including juices, as well as candies, gums, sweetmeats, medicines, including mouthwashes and gargles, and like ingestible or orally-acceptable materials, including all other types of drinkables and chewables.

Edible Colorings

Any pigment or other coloring which is ingestible or orally acceptable and which, like all flavorings or seasonings, are preferably but not necessarily "generally recognized as safe" (GRAS). Many are disclosed hereinafter.

Edible Fats and Oils

Edible fats and oils usually originate from animal and plant sources. Those of animal origin include those from milkfat and animal depot fats. Those of plant origin include the lauric acids, the oleiclinoleic and the linoleic fats and oils. Edible fats and oils include, but are not limited to, the following: almond oil, butter fat, cocoa butter, coconut oil, corn oil, cottonseed oil, lard, lard oil, olive oil, palm oil, peanut oil, safflower oil, sesame oil, soybean oil, sunflower oil and tallow. As used herein the terms fat or oil are used interchangeably.

Materials Employed

Diacetyl tartaric acid esters of monoglycerides—Usually Grinsted Products, Inc., Panodan SD (TM) brand. Panodon FD (TM) and Panodon 234 (TM) and Eastman Chemical Products, Inc. Myvatem (TM) brand are also suitable. All conform to Food Chemical Codex III, p. 98–99.

Cottonseed Oil—Welch, Holme & Clark, Inc.
Soybean Oil—Welch, Home & Clark, Inc.
Coconut Fat—Welch, Holme & Clark, Inc.
Lard—Armour, Inc.
Butter—Land O'Lakes, Inc.
Propylene glycol alginate—Kelcoloid S(TM), Merck & Co., Inc.

SUMMARY OF THE INVENTION

The present invention relates to a homogenous liquid condimental composition consisting essentially of (1) tartaric and esters of mono acid diglyceride; (2) an edible fat or oil or mixtures thereof, wherein such edible fat or oil is miscible in (1); and (3) one or more condiments selected from edible flavorings and edible colorings, when one such condiment is oleoresin black pepper, benzyl alcohol is present in a weight ratio of benzyl alcohol to oleoresin black pepper of at least 2:3. The ratio by weight of (1) plus (2) to (3) is at least about 1:9, preferably between about 1:9 to about 99:1, more preferably between about 1:9 to about 9:1, and most preferably between about 3:7 to about 7:3. The ratio by weight of (1) to (2) is preferably between about 1:4 to about 4:1, more preferably between about 2:3 to about 3:2, and most preferably 1:1. When one such condiment is oleoresin black pepper, benzyl alcohol is present in a weight ratio of benzyl alcohol to oleoresin black pepper of at least 2:3, preferably between about 2:3 and about 9:1, more preferably between about 9:11 and about 11:9, and most preferably about 1:1. The condiment portion (3) should comprise at least one condiment from the group consisting of (a) spice oleoresins, (b) essential oils, and (c) edible colorings. It is preferably that ingredients (1), (2) and (3) be present in a weight ratio of about 1:1:0.5, respectively. The present invention further relates to foods or beverages seasoned, flavored or colored with the condimental composition.

Ratios of Ingredients

Although the weight ratio of (1) and (2) combined to condiment (3) in the composition is at least 1:9, preferably between about 1:9 and about 99:1, more preferably between about 1:9 to about 9:1, and most preferably between about 3:7 to about 7:3, and the weight ratio of (1) to (2) is preferably between about 2:3 to about 3:2, and most preferably about 1:1, the upper and lower limits can vary substantially depending on the results desired by simple experimentation. Similarly, when one of the condiments is oleoresin black pepper, the weight ratio of benzyl alcohol to oleoresin black pepper is at least 2:3, preferably between about 2:3 and about 3:2, more preferably between about 9:11 and about 11:9, and most preferably about 1:1, the upper and lower limits can vary substantially depending on the results desired by simple experimentation. By varying the ratios, one can alter the dispersibility of the seasoning composition, the cost of the product and the physical properties of the seasoning composition, i.e. liquid versus solid. Notwithstanding the above variations, the various ratios depend upon the compatibility of the particular dispersing system and the condiment portion.

Although it is the primary intent of this invention to provide a liquid condimental composition useful in flavoring or coloring foods and beverages and which is dispersible in both oil and water, it is readily apparent that such a condimental composition may, under certain conditions and weight ratios of components, be a solid. Such a solid condimental composition is intended to be within the scope of the invention, if it is useful in flavoring or coloring foods and beverages and is dispersible in both oil and water.

DETAILED DESCRIPTION OF THE INVENTION

The following examples are given by way of illustration only and are not to be construed as limiting. As used in these examples, the term oleoresin black pepper denotes a mixture of oleoresin black pepper and benzyl alcohol in a 50:50 weight ratio.

EXAMPLE A

Vegetable Oil and tartaric acid esters

A mixture of 25% vegetable* oil, 25% tartaric acid esters,** and 50% oleoresin paprika was prepared by mixing at room temperature until homogenous. One gram of the mixture was added to 100 cc water in a 100 cc graduated cylinder and shaken. The mixture was fully dispersed within 1 minute. Upon standing, the color slowly floats out. The mixture is readily dispersible in oil.

**Panodan SD(TM), whenever asterisked herein *Cottonseed oil, whenever asterisked herein.

EXAMPLE B

Use of the above dispersing agents, singly

When the oleoresin, e.g. oleoresin paprika, is warmed to effect solution in tartaric acid esters**, it will not disperse satisfactorily in water. This is also the case with mixtures of oleoresin and edible fats or oils.

EXAMPLE C

Use of the above dispersing agents, singly

When oleoresin black pepper and tartaric acid esters** are combined in a 1:1 weight ratio with heating to effect solution, the resultant mixture will not disperse satisfactorily in water. When oleoresin black pepper and vegetable oil* are combined in a 1:1 weight ratio with heating to effect solution, the resultant mixture will not disperse satisfactorily in water.

EXAMPLE D

Ratios of vegetable oil to tartaric acid esters of mono- and diglycerides

In this experiment, vegetable oil* and tartaric acid ester** were combined in varying ratios in a 9:1 ratio with oleoresin paprika, oleoresin cinnamon and a basil mixture comprising basil oil and oleoresin basil.

The dispersibility of each mixture was observed, as well as the tendency to "float out" upon standing for 24 hours. Additionally, the redispersibility of the condimental composition was tested after "float out". The mixtures were prepared and tested according to the procedure in Example A. The results are summarized in Table A.

EXAMPLE E

Ratios of vegetable oil to tartaric acid esters of mono- and diglycerides

In this experiment, vegetable oil* and tartaric acid ester** were combined in varying ratios in a 9:1 ratio with oleoresin black pepper.

The dispersibility of each mixture was observed, as well as the tendency to "float out" upon standing overnight. Additionally, the redispersibility of the condimental composition was tested after "float out". The mixtures were prepared and tested according to the procedure in Example A. The results are summarized in Table C.

EXAMPLE F

Ratios of the dispersing agents to condiments

In this experiment, vegetable oil* and tartaric acid ester** in a 1:1 ratio were combined in varying ratios with oleoresin paprika, oleoresin cinnamon and a basil mixture comprising basil oil and oleoresin basil.

The dispersibility of each mixture was observed, as well as the tendency to "float out" upon standing for 24 hours. Additionally, the redispersibility of the condimental composition was tested after "float out". The mixtures were prepared and tested according to the procedure in Example A. The results are summarized in Table B.

EXAMPLE G

Ratios of the dispersing agents to condiments

In this experiment, vegetable oil* and tartaric acid ester** in a 1:1 ratio were combined in varying ratios with oleoresin black pepper.

The dispersibility of each mixture was observed, as well as the tendency to "float out" upon standing for 24 hours. Additionally, the redispersibility of the condimental composition was tested after "float out". The mixtures were prepared and tested according to the procedure in Example A. The results are summarized in Table D.

EXAMPLE H

Lard and Tartaric Acid Esters

A mixture of 40% lard, 40% tartaric acid esters, and 20% of a basil mixture comprising basil oil and oleoresin basil was prepared. Initially, the lard was heated to above its melting point and combined with the tartaric acid esters and basil mixture. The resulting mixture remained a liquid upon return to room temperature. This mixture readily dispersed in water according to the procedure of Example A. Upon standing, some separation occurred but was easily redispersed with mixing.

EXAMPLE I

Lard and Tartaric Acid Esters

A mixture of 45% lard, 45% tartaric acid esters, and 10% oleoresin black pepper was prepared. Initially, the lard was heated to above its melting point and combined with the tartaric acid esters and oleoresin black pepper. The resulting mixture remained a liquid upon return to room temperature. This mixture readily dispersed in water according to the procedure of Example A. Upon standing, some separation occurred but was easily redispersed with mixing.

EXAMPLE J

Butter and Tartaric Acid Esters

A mixture of 45% butter, 45% tartaric acid esters**, and 10% oleoresin paprika was prepared and tested according to the procedure of Example E. At room temperature the mixture remained a liquid. The mixture readily dispersed in water, however, it appeared that some of the mixture precipitated out and was not redispersible.

EXAMPLE K

Butter and Tartaric Acid Esters

A mixture of 45% butter, 45% tartaric acid esters**, and 10% oleoresin black pepper was prepared and tested according to the procedure of Example E. At room temperature the mixture remained a liquid. The mixture readily dispersed in water, however, it appeared that some of the mixture precipitated out and was not redispersible.

EXAMPLE L

Coconut Fat and Tartaric Acid Esters

A mixture of 40% coconut fat, 40% tartaric acid esters** and 20% of a cinnamon mixture comprising cinnamon oil and oleoresin cinnamon was prepared and tested according to the procedure of Example E. At room temperature the mixture remained a liquid. This mixture readily dispersed in water. Upon standing, some separation occurred but was readily redispersible with agitation.

EXAMPLE M

Coconut Fat and Tartaric Acid Esters

A mixture of 45% coconut fat, 45% tartaric acid esters** and 10% oleoresin black pepper was prepared and tested according to the procedure of Example E. At room temperature the mixture remained a liquid. This mixture readily dispersed in water. Upon standing, some separation occurred but was readily redispersible with agitation.

EXAMPLE N

Soybean Oil and Tartaric Acid Esters

A mixture of 40% soybean oil, 40% tartaric acid ester** and 20% of a celery mixture comprising celery oil and oleoresin celery was prepared and tested according to Example A. This mixture readily dispersed in water. Upon standing, some separation occurred but was readily redispersible with agitation.

EXAMPLE O

Soybean Oil and Tartaric Acid Esters

A mixture of 40% soybean oil, 40% tartaric acid ester** and 20% of a basil mixture comprising basil oil and oleoresin basil was prepared and tested according to Example A. This mixture readily dispersed in water. Upon standing, some separation occurred but was readily redispersible with agitation.

EXAMPLE P

Dispersibility in Brine Solution

A mixture of 45% vegetable oil*, 45% tartaric acid esters** and 10% of a celery mixture comprising celery oil and oleoresin celery was prepared according to the procedure of Example A. One gram of such mixture was added to and readily dispersed in 100 cc of a 10% brine solution (NaCl). Upon standing, a slight separation of the mixture was observed, but was readily redispersible with agitation.

EXAMPLE Q

Dispersibility in Brine Solution

A mixture of 40% vegetable oil*, 40% tartaric acid esters** and 20% oleoresin black pepper was prepared according to the procedure of Example A. One gram of such mixture was added to and readily dispersed in 100 cc of a 10% brine solution (NaCl). Upon standing, a slight separation of the mixture was observed, but was readily redispersible with agitation.

EXAMPLE R

Dispersibility in Sugar

A mixture of 50% soybean oil, 40% tartaric acid esters** and 20% of a cinnamon mixture comprising cinnamon oil and oleoresin cinnamon mixture comprising cinnamon oil and oleoresin cinnamon was prepared according to the procedure of Example A. One gram of such mixture was added to and readily dispersible in 100 cc of a 10% sugar-water solution (sucrose). Upon standing, a slight separation of the mixture was observed but was readily redispersible with agitation.

EXAMPLE S

Vegetable Oil and Tartaric Acid Esters

A mixture of 45% vegetable oil*, 45% Myvatem(TM) and 10% oleoresin mace was prepared and tested according to the procedure of Example A. The mixture readily dispersed in water. Upon standing, some separation was observed but was readily redispersible with agitation.

The previous examples have limited themselves to the use of natural flavorings. This invention, however, encompasses all condiments, whether they be natural or synthetic. For example, synthetic capsanthin, lycopene, or beta-apo-8 carotenal can be substituted for the oleoresin paprika in the above examples, in the manner known to the art for matching tinctorial power. Synthetic beta-carotene can be substituted for an extract of annatto, in which the predominant pigment is bixin or, if saponified, norbixin. Synthetic cinnamon can be substituted for oleoresin cinnamon, vanillin for vanilla extract, and so on. A more complete list of flavors which may be present includes dill, garlic, ginger, clove, bay, pimento, cassia, caraway, capsicum, celery, coriander, nutmeg, paprika, black pepper, mustard, marjoram, thyme, sage, basil, spearmint, peppermint, lemon, orange, and tarragon, inter alia.

One versed in the art will discern that this invention applies to any condiment, whether it be natural or synthetic, a flavor or a color, a single substance or a mixture of substances.

Examples Providing Detailed Description of the Application of the Composition of this Invention The following examples describe the application of this invention. When not noted otherwise, the "w/o flavor" consists of specific oleoresins or oleoresins in combination with the essential oil of such oleoresin. In all cases, the weight ratio of vegetable oil* to tartaric acid esters** was about 1:1. The weight ratio of vegetable oil* plus tartaric acid esters** to condiments ranged between about 6:5 to about 99:1. The w/o flavors were stable against precipitation and development of rancidity.

1. Marinara Sauce

The marinara sauce was prepared according to the following recipe:

| Ingredients | Wt. % |
|---|---|
| Water | 28.790 |
| Citric acid, 50% solution | 0.120 |
| Sugar, granulated | 2.000 |
| Salt | 1.200 |
| Kelcoloid S | 0.200 |
| Corn oil | 1.900 |
| Tomato puree. | 65.700 |
| Onion w/o Flavor | 0.020 |
| Garlic w/o Flavor | 0.010 |
| Black Pepper w/o Flavor | 0.030 |
| Basil w/o Flavor | 0.015 |
| Origanum w/o Flavor | 0.015 |
| | 100.000 |

The sugar, salt and Kelcoloids were dry mixed. The dry mix was dispersed in the water and citric acid solution under continuous agitation. The remainder of the ingredients were added and mixed well. This mixture was brought to a boil and simmered for 5 minutes. The resultant marinara sauce was then hot packed in jars.

2. Seasoned Pork Sausage

The seasoned pork sausage was made according to the following recipe:

| Ingredients | Wt. % |
|---|---|
| Pork mixture (containing 90% ground lean pork and 10% cubed pork fat) | 96.808 |
| Salt | 1.250 |
| Vinegar, white, 50 grain | 1.000 |
| Sugar, superfine | 0.750 |
| Sodium nitrite | 0.020 |
| Sage w/o Flavor | 0.008 |
| Black Pepper w/o Flavor | 0.100 |
| Onion w/o Flavor | 0.036 |
| Clove w/o Flavor | 0.012 |
| Nutmeg w/o Flavor | 0.008 |
| Mace w/o Flavor | 0.008 |
| | 100.000 |

All ingredients were combined and mixed well. The mixture was then fed into pork casings and tied intermittently and at both ends with threads. The resultant seasoned pork sausage was aged overnight at refrigeration temperature.

3. Oriental Oil-Vinegar Salad Dressing

The oriental oil-vinegar salad dressing was prepared according to the following recipe:

| Ingredients | Wt. % |
| --- | --- |
| Sesame oil | 53.995 |
| Vinegar, 50 grain | 29.000 |
| Soy sauce | 10.000 |
| Water | 6.000 |
| Lemon Flavor | 0.030 |
| Scallions ⅛", freeze dried | 0.100 |
| Salt | 0.260 |
| Xanthum gum | 0.250 |
| Mono-sodium glutamate | 0.210 |
| Propylene glycol alginate | 0.100 |
| Garlic w/o Flavor | 0.005 |
| Ginger w/o Flavor | 0.050 |
| | 100.000 |

All the powder ingredients were dry blended and then added to water under vigorous agitation. The soy sauce, lemon flavor, vinegar and w/o flavors were added to the mixture. The gums were dispersed in the sesame oil and added under agitation to the aqueous phase. The scallions were then added and the resultant oriental oil-vinegar salad dressing was refrigerated. The w/o flavors imparted flavor to both the oil and aqueous phases of the salad dressing. Such a distribution of w/o flavor between the oil and water phases is one of the purposes of this invention. The utility of this aspect of the invention is considerable, as will be apparent to a food technologist.

4. Minestrone Soup

The minestrone soup was prepared according to the following recipe:

| Ingredients | Wt. % |
| --- | --- |
| Water | 51.650 |
| Potatoes, diced | 9.900 |
| Zucchini, cut | 8.970 |
| Kidney beans cooked | 8.330 |
| Cabbage, shredded | 5.000 |
| Lima beans, green, cooked | 4.210 |
| Macaroni, elbow, dried | 3.670 |
| Carrot, diced | 3.530 |
| Tomato Paste | 2.450 |
| Salt Pork | 1.900 |
| Salt | 0.250 |
| Parsley, minced | 0.100 |
| Black Pepper w/o Flavor | 0.010 |
| Celery w/o Flavor | 0.005 |
| Origanum w/o Flavor | 0.004 |
| Basil w/o Flavor | 0.006 |
| Garlic w/o Flavor | 0.005 |
| Onion w/o Flavor | 0.010 |
| | 100.000 |

The salt pork, parsley and water were combined and heated for about 10 minutes. The tomato paste was added and the mixture was cooked for 15 minutes. The cabbage was then added and the mixture was cooked for another 10 minutes. The beans were added and the mixture was brought to a boil. Upon reaching boil, the macaroni and salt were added and the mixture was cooked until the macaroni was tender. The w/o flavors were then added and the resultant minestrone soup was hot packed into jars and retorted at 250° for 15 minutes.

5. Creamy Italian Dressing

The creamy italian dressing was prepared according to the following recipe:

| Ingredients | Wt. % |
| --- | --- |
| Corn oil | 47.975 |
| Water | 37.480 |
| Vinegar, 100 grain | 6.000 |
| Sour cream powder | 4.000 |
| Sugar, superfine | 1.000 |
| Salt | 1.000 |
| Cultured non-fat milk solids | 1.000 |
| Egg yolk solids | 0.500 |
| Polysorbate 60 | 0.400 |
| Xanthum gum | 0.250 |
| Parsley flakes | 0.200 |
| Propylene glycol alginate | 0.100 |
| Basil w/o Flavor | 0.030 |
| Black Pepper w/o Flavor | 0.030 |
| Origanum w/o Flavor | 0.020 |
| Garlic w/o Flavor | 0.010 |
| Onion w/o Flavor | 0.005 |
| | 100.000 |

The water, vinegar and w/o flavors were combined and mixed. The gums were dispersed in the corn oil and added to the aqueous mixture under agitation. The dry ingredients were then added and the entire mixture was homogenized for about 5 minutes. The parsley flakes were then mixed in and the resultant creamy Italian dressing was refrigerated.

6. Beverages and Juices

As pointed out in the prior description of the invention, the "w/o flavors" are not water soluble, but rather are only water dispersible. Upon standing in water alone, they will tend to separate. This is particularly true if the "w/o flavor" contains oleoresins which contain large amounts of vegetable oils. However, this invention provides such a fine dispersion of the oleoresins that they may be used to flavor and color beverages, including juices, containing sufficient suspended matter (cloud or fibers) to absorb the dispersed "w/o flavor". A spiced tomato juice drink was prepared according to the following recipe:

| Ingredients | Wt. % |
| --- | --- |
| Tomato Juice, no additives | 98.955 |
| Salt, granulated | 1.000 |
| Debittered celery w/o flavor | 0.040 |
| Black pepper w/o flavor | 0.005 |
| | 100.000 |

All ingredients were combined and mixed well. The resultant spiced tomato juice drink can be pasteurized (195° F. for 30 seconds) and packed into a suitable container. Neither the debittered celery nor black pepper w/o flavor were observed to separate from the juice.

It is to be understood that the invention is not to be limited to the exact details of operation or exact compounds, compositions, methods, or procedures shown and described, as obvious modifications and equivalents will be apparent to one skilled in the art.

TABLE A

Effect of varying ratios of tartaric acid esters** and vegetable oil* upon the dispersibility and stability of oleoresin paprika, oleoresin cinnamon and basil mixture

| Solvent, % | | Dispersibility | | | Stability | | |
|---|---|---|---|---|---|---|---|
| Ester | V.O. | Cinnamon | Paprika | Basil | Cinnamon | Paprika | Basil |
| 0 | 100 | incomplete | incomplete | incomplete | floats | floats | floats |
| 10 | 90 | incomplete | incomplete | improved, but poor | floats | floats | oil layer, redispersible |
| 20 | 80 | disperses | incomplete | disperses | layers, easily redispersible | semi-floats | oil layer, redispersible |
| 30 | 70 | disperses | disperses | disperses | layers, easily redispersible | some separation, redispersible | redispersible |
| 40 | 60 | disperses | disperses | disperses | slight float, redispersible | slight float, redispersible | slight float, redispersible |
| 50 | 50 | disperses | disperses | disperses | slight float, redispersible | slight float, redispersible | slight float, redispersible |
| 60 | 40 | disperses | disperses | disperses | slight float, redispersible | slight float, easily redispersible | slight float, redispersible |
| 70 | 30 | disperses | poor dispersion | disperses | layers, redispersible | some separation, easily redispersible | slight float, redispersible |
| 80 | 20 | disperses | incomplete | poorly dispersed | layers on bottom, redispersible | separation on bottom, easily redispersed | layers on bottom, redispersible |
| 90 | 10 | disperses | incomplete | partially disperses | layers on bottom, redispersible | separation on bottom, easily redispersed | layers on bottom, redispersible |
| 100 | 0 | incomplete | incomplete | very poorly disperses | layers on bottom, poor redispersibility | separation on bottom, easliy redispersed | very poorly redispersible |

TABLE B

Effect of varying the ratio of dispersing agents to condiments upon the dispersibility of oleoresin paprika, oleoresin cinnamon and basil mixture.

| % Solvent | % Condiment | Dispersibility | | | Stability | | |
|---|---|---|---|---|---|---|---|
| | | Cinnamon | Paprika | Basil | Cinnamon | Paprika | Basil |
| 10 | 90 | slight dispersion | partial dispersion | poor dispersion | floats, no redispersion | layered redispersible | float, poor redispersion |
| 20 | 80 | unproved, poor dispersion | dispersible/ some float | poor dispersion | floats, slight redispersion | layered, redispersible | float, poor redispersion |
| 30 | 70 | dispersion | dispersible/ some float | poor dispersion | floats, spoon redispersiblity | slight float, redispersible | layered, redispersible |
| 40 | 60 | layers, some dispersion | disperses | poor dispersion | some separation, redispersible | slight float, redispersible | layered, redispersible |
| 50 | 50 | layers, some dispersion | disperses | fair dispersion | some separation, redispersible | slight float, easily redispersed | slight layering, easily redispersed |
| 60 | 40 | dispersible | disperses | fair dispersion | some separation, redispersible | slight float, easily redispersed | slight layering, easily redispersed |
| 70 | 30 | dispersible | disperses | good dispersion | slight float, easily redispersed | slight float, easily redispersed | slight layering, easily redispersed |
| 80 | 20 | dispersible | disperses | good dispersion | slight float, easily redispersed | slight float, easily redispersed | slight layering, easily redispersed |
| 90 | 10 | dispersible | disperses | good dispersion | slight float, easily redispersed | slight float, easily redispersed | slight layering, easily redispersed |

TABLE C

Effect of varying ratios of tartaric acid esters** and vegetable oil* upon the dispersibility and stability of oleoresin black pepper

| Solvent, % | | Dispersibility | Stability |
|---|---|---|---|
| Ester | V.O. | | |
| 0 | 100 | no dispersion | sample floats |
| 10 | 90 | incomplete dispersibility | sample floats out, not redispersible |
| 20 | 80 | incomplete dispersibility | sample floats out, not redispersible |
| 30 | 70 | complete dispersibility | some layering, completely redispersible |
| 40 | 60 | complete dispersibility | some layering, completely redispersible |
| 50 | 50 | complete dispersibility | some layering, completely redispersible |
| 60 | 40 | complete dispersibility | some layering, completely redispersible |
| 70 | 30 | complete dispersibility | some layering, completely redispersible |
| 80 | 20 | complete dispersibility | separation on bottom, redispersible |
| 90 | 10 | incomplete dispersibility | separation on bottom, redispersible |
| 100 | 0 | very poor dispersion | separation on bottom, not redispersible |

TABLE D

Effect of varying the ratio of dispersing agents to condiments upon the dispersibility of oleoresin black pepper.

| % Solvent | % Condiment | Dispersibility | Stability |
|---|---|---|---|
| 10 | 90 | very poor dispersion | sample floats, not redispersible |
| 80 | 20 | poor dispersion | sample floats, |

TABLE D-continued

Effect of varying the ratio of dispersing agents to condiments upon the dispersibility of oleoresin black pepper.

| % Solvent | % Condiment | Dispersibility | Stability |
|---|---|---|---|
| 70 | 30 | poor dispersion | not redispersible sample floats, not redispersible |
| 60 | 40 | incomplete dispersion | some float, redispersible |
| 50 | 50 | incomplete dispersion | some separation, easily redispersible |
| 40 | 60 | complete dispersion | some separation, easily redispersible |
| 30 | 70 | complete dispersion | some separation, easily redispersible |
| 20 | 80 | complete dispersion | good dispersion |
| 10 | 90 | complete dispersion | good dispersion |

What is claimed is:

1. An edible, homogeneous, single system, liquid composition useful as a dispersing agent for the preparation of oil-in-water or water-in-oil edible dispersions consisting essentially of a tartaric acid ester and an edible fat or oil, said edible fat or oil being miscible in said tartaric acid ester and being selected from the group consisting of almond oil, butter fat, cocoa butter, coconut oil, corn oil, cottonseed oil, safflower oil, tallow, soybean oil, lard oil, olive oil, palm oil, peanut oil, sesame oil and sunflower oil.

2. A composition in accordance with claim 1 wherein said tartaric acid ester is a diacetyl tartaric acid ester of a monoglyceride.

3. A composition in accordance with claim 1 wherein said tartaric acid ester and said edible fat or oil are present in the weight ratio of about 1:1, respectively.

4. A composition in accordance with claim 1 wherein said tartaric acid ester and said edible fat or oil are present in the weight ratio from about 2:1 to about 3:2, respectively.

5. A food product containing an edible oil-in-water or water-in-oil dispersion wherein the dispersing agent employed for the preparation of said oil-in-water or water-in-oil dispersion in said food product consists essentially of a homogeneous, liquid, single system of tartaric acid ester or mono- and diglycerides and an edible fat or oil, said edible fat or oil being miscible with said tartaric acid ester.

6. A method of preparing edible oil-in-water or water-in-oil dispersions which comprises employing as the dispersing agent for said dispersions a homogeneous, liquid, single system, edible composition consisting essentially of a tartaric acid ester of mono- and diglycerides and an edible fat or oil, said edible fat or oil being miscible in said tartaric acid ester, and being selected for a group consisting of almond oil, butter fat, cocoa butter, coconut oil, corn oil, cottonseed oil, safflower oil, tallow, soybean oil, lard oil, olive oil, palm oil, peanut oil, sesame oil and sunflower oil, and wherein said tartaric acid ester and said edible fat or oil are present in a weight ratio in the range between about 1:4 and 4:1.

* * * * *